United States Patent
Stupachenko et al.

(10) Patent No.: US 11,010,280 B1
(45) Date of Patent: May 18, 2021

(54) SYSTEM AND METHOD FOR VIRTUALIZATION-ASSISTED DEBUGGING

(71) Applicant: Parallels International GmbH, Schaffhausen (CH)

(72) Inventors: Andrey Stupachenko, Moscow (RU); Nikolay Dobrovolskiy, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 82 days.

(21) Appl. No.: 16/352,106

(22) Filed: Mar. 13, 2019

(51) Int. Cl.
*G06F 11/00* (2006.01)
*G06F 11/36* (2006.01)
*G06F 9/455* (2018.01)

(52) U.S. Cl.
CPC ...... *G06F 11/3664* (2013.01); *G06F 9/45558* (2013.01); *G06F 11/3624* (2013.01); *G06F 2009/45591* (2013.01)

(58) Field of Classification Search
CPC ............. G06F 11/0706; G06F 11/0718; G06F 11/3612; G06F 11/3636; G06F 11/366; G06F 11/3668; G06F 11/3672; G06F 11/3688; G06F 11/367; G06F 11/08; G06F 11/079; G06F 11/3406; G06F 11/3452; G06F 11/3604
USPC ............................................ 714/38.1, 1–57
See application file for complete search history.

(56) References Cited

U.S. PATENT DOCUMENTS

| | | | | |
|---|---|---|---|---|
| 9,454,461 | B1* | 9/2016 | Bates | G06F 8/70 |
| 10,162,665 | B1* | 12/2018 | Eidelman | G06F 13/24 |
| 2009/0083735 | A1* | 3/2009 | Kimura | G06F 11/2038 718/1 |
| 2009/0182976 | A1* | 7/2009 | Agesen | G06F 12/1009 711/207 |
| 2010/0333090 | A1* | 12/2010 | Wright | G06F 9/45558 718/1 |
| 2011/0225458 | A1* | 9/2011 | Zuo | G06F 11/362 714/37 |
| 2013/0007729 | A1* | 1/2013 | Sirotkin | G06F 9/452 718/1 |
| 2016/0070630 | A1* | 3/2016 | Williams | G06F 11/2236 714/33 |
| 2017/0123960 | A1* | 5/2017 | Pechanec | G06F 11/3664 |
| 2017/0364379 | A1* | 12/2017 | Warkentin | G06F 11/3636 |
| 2018/0113764 | A1* | 4/2018 | Bhandari | G06F 11/1441 |
| 2019/0020559 | A1* | 1/2019 | Cao | G06F 11/3079 |
| 2020/0042698 | A1* | 2/2020 | Urias | G06F 9/45558 |
| 2020/0050364 | A1* | 2/2020 | Gilbert | G06F 3/062 |

\* cited by examiner

*Primary Examiner* — Sarai E Butler
(74) *Attorney, Agent, or Firm* — Rosenberg, Klein & Lee (57) ABSTRACT

Disclosed are systems and methods for debugging program code using a computing system. The disclosed method includes designating a control point in a software application subject to a debugging procedure, and then executing the program code for the software application as a guest application executing within a virtual machine. Upon detection of a virtualization event, the hardware processor transfers program control to a hypervisor which then determines whether the virtualization event corresponds to the designated control point based on an execution state of the guest application. If so, the virtualization event handler may generate a debugging event that is used by a debugger.

27 Claims, 4 Drawing Sheets

SYSTEM AND METHOD FOR VIRTUALIZATION-ASSISTED DEBUGGING

FIELD OF TECHNOLOGY

The present disclosure relates generally to the field of software debugging, more specifically, to systems and methods of debugging software applications using virtualization-based techniques.

BACKGROUND

Debugging code, especially system-level code, is a difficult task. Currently, using popular debugging software such as GNU Debugger (GDB), LLDB Debugger, WinDBG, a user is limited with breakpoints, including hardware breakpoints, watchpoints, and tracing using breakpoints or trace flags (hardware-assisted). However, such software-emulated and hardware-assisted techniques have their limitations. Software breakpoints require modification of program code to insert special breakpoint instructions (e.g., "bp" or "bu" commands), which can be unacceptable in some cases. Hardware breakpoints require the use of specialized registers (e.g., "dr" registers) in the processor architecture and therefore have a limited number of hardware breakpoints (e.g., 4 breakpoints in x86 architecture, 2 breakpoints in ARM-based architectures). Watchpoints are a special breakpoint that stops execution of an application whenever the value of a given expression changes or whenever a specified condition is true (without specifying where it might occur). However, a limited number of watchpoints work if only the software developer is able to guess access item size (e.g., byte, 32-bit, or 64-bit). Hardware-assisted tracing cannot trace certain commands (e.g., IRET, POP SS, LSS, call and task gates, and any other privilege ring switching). There is also a hardware limitation to skip tracing events, after stack segment modification, and such technique is used as an anti-debugging trick.

SUMMARY

Accordingly, aspects of the present disclosure provide a novel virtualization-assisted debugging technique that uses virtualization technology as an additional debugging event processor and generator to provide improved functionality and flexibility without the above-described drawbacks. Thus, a system and method is disclosed herein for debugging program code using a computing system, and, more particularly, for debugging program code using hardware virtualization-assisted technique.

According to one aspect of the present disclosure, a system and computer-implemented method for debugging program code using a computing system are provided. The described method includes designating a control point in a software application subject to a debugging procedure, and executing, by a hardware processor, program code for the software application as a guest application executing within a virtual machine. The method further includes transferring, by the hardware processor, program control to a hypervisor in response to detecting a virtualization event caused by execution of the guest application. The method includes determining whether the virtualization event corresponds to the designated control point based on an execution state of the guest application, and generating a debugging event in response to determining that the virtualization event corresponds to the designated control point.

In another aspect, determining whether the virtualization event corresponds to the designated control point based on an execution state of the software application includes determining that an address associated with the designated control point matches a virtual program counter from the execution state of the guest application.

In another aspect, the method further includes transferring, by the hardware processor, program control to the hypervisor in response to detecting a nested page fault for the guest application executing within the virtual machine.

In another aspect, the method further includes transferring, by the hardware processor, program control to the hypervisor in response to detecting a stage-2 translation fault for the guest application executing within the virtual machine.

In another aspect, the method further includes transferring, by the hardware processor, program control to the hypervisor in response to detecting a monitor trap flag for the guest application executing within the virtual machine.

In another aspect, the hypervisor is executing in a virtual machine extension (VMX) root mode of operation.

In another aspect, the hypervisor is executing in an exception layer 2 mode of operation.

In another aspect, the virtualization event is not a hardware debug exception or a hardware breakpoint exception.

In another aspect, the transferring of the program control is performed without inserting debugging program instructions into the program code for the software application.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for debugging program code using virtualization-assisted techniques. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Known debuggers, like GDB, LLDB, or WinDGB intercept a software application subject to a debugging procedure (referred to herein as a debuggee) by controlling a special debugging exception, for example, Interrupt 1 on Intel IA32 and AMD64 architectures (also referred to as #DB). Aspects of the present disclosure provide a technique for controlling the debuggee by the virtualization events the debuggee produces during execution within a virtual machine. A specially-configured hypervisor that manages the virtual machine may process such virtualization events, permitting many such events to simply pass through (as normal virtualization events), and requiring only a few to be handled by a debugger. Additionally, aspects of the present disclosure may be extended to hook the debugging exception to combine the disclosed technique with known debugging approaches using software breakpoints, hardware breakpoints, watchpoints, hardware-assisted tracing, and other approaches.

Figure 1:
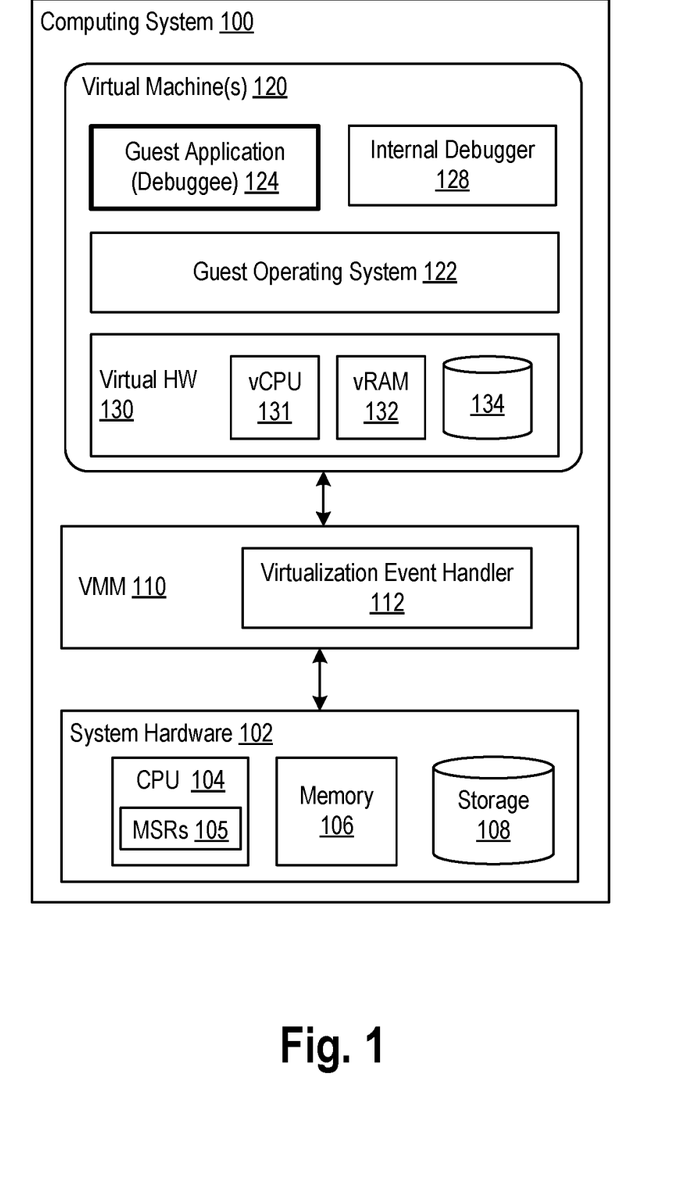
FIG. 1 is a block diagram illustrating a system for debugging program code according to an exemplary aspect.

FIG. 1 is a block diagram illustrating a computing system 100 for debugging program code using a computing system according to an exemplary aspect. The computing system 100 may be any computing device, physical server, host system, computer server, desktop, laptop, handheld device, tablet device, smartphone, or any other electronic device suitable for implementing virtualization as described herein. As shown, the host system 100 generally includes one or more virtual machines 120 that can be created on a host platform that includes system hardware 102, a host operating system, and a virtual machine monitor 110 (also referred to herein as a hypervisor or a virtualizer). The virtual machine monitor 110 (hereinafter referred to as "VMM 110") provides a guest operating system 122 of the virtual machine 120 with a virtual operating platform (depicted as virtual hardware 130) and manages execution of the guest OS 122. The VMM 110 may run directly on the underlying system hardware 102 or as an application or component running within a host operating system (not shown) installed on the system hardware 102. Exemplary operations of a VMM 110 in various configurations are described in greater detail in U.S. Pat. No. 7,865,893 B1, "System and Method for Starting Virtual Machine Monitor in Common with Already Installed Operating System", which is incorporated herein by reference in its entirety.

As shown, the system hardware 102 of a host can include at least one computer processing unit (CPU) 104, memory 106 (e.g., random access memory), and storage devices 108 (e.g., hard disk drives). The host system 100 may include additional devices, software modules, and the like, as would be appreciated to one skilled in the art, but are not shown herein so as to not unnecessarily obscure the aspects of the disclosure. As software, the code for the VM 120 will typically execute on the actual system hardware 102.

In the exemplary aspect, the virtual machine 120 has both virtual system hardware 130 and guest system software, including the guest OS 122. The virtual system hardware 130 can include a virtual CPU 131, virtual memory 132, a virtual disk 134, as well as other virtual hardware components, such as a virtual network interface. It is noted that all of the virtual hardware components of the virtual machine 120 can be implemented in software to emulate corresponding physical components, for example, using a virtual device emulator module. The guest OS 122 may be configured to support execution of one or more guest processes. A guest process may be a running instance of program code that is part of a user-level application or guest application.

The VMM 110 acts as the interface between guest software executing within the VM 120, including one or more guest processes 124 and guest OS 122, and the hardware components and devices in the underlying system hardware platform 102 of the host machine. For example, to manage memory during operation of the VM 120, when a user-level guest process 124 requests a page of memory, the guest OS 122 allocates memory in an address space of the guest physical memory 132. The address space of guest physical memory 132 will be mapped to another memory address space of the host physical memory 106 of the system hardware 102. In this regard, the VMM 110 can maintain a paging structure, including one or more page tables or translation tables, such as the exemplary page mapping shown U.S. Pat. No. 7,596,677, the entire contents of which are hereby incorporated by reference.

The guest physical memory 132 of the virtual machine 120 is backed by the corresponding host physical memory 106 in system hardware 102. For clarity of discussion, the term "guest physical memory" or "guest OS memory" refers to emulated memory (e.g., virtual memory 132) that is visible to the guest OS 122. The term "guest virtual memory" refers to a virtual address space 133 exposed to guest applications or guest processes 124 and provided by the guest OS 122 as a memory management technique that uses disk storage to extend physical memory. "Host virtual memory" refers to a continuous virtual address space that the host itself may expose to the VMM 110, host OS processes (such as a host-side process), and/or a host operating system using virtual memory techniques. The term "host physical memory" refers to hardware memory or machine memory (e.g., memory 106) that is visible from the perspective of the VMM 110. Portions of the guest virtual memory 133 are ultimately backed by one or more machine memory pages according to memory mapping methodology performed by the VMM 110.

In one aspect, the CPU 104 may include one or more model-specific registers (MSRs) 105 which are a group of control registers made available for specialized processor functionality, such as virtual-machine extensions, operating-system, and privileged procedures (i.e., instructions executing at a privilege level 0). In case of Intel x86 instruction-set-compatible processors, examples of MSRs 105 include registers associated with the target address of system call handling code, such as IA32 STAR, IA32 LSTAR, IA32 CSTAR, IA32 FMASK for 64-bit modes and IA32 SYSENTER CS, IA32 SYSENTER EIP, IA32 SYSENTER SS, IA32 SYSENTER ESP for 32-bit modes. MSRs 105 may also be used to save different guest states of different VMs and the host state between context switches during virtualization. The use of MSRs 105 are described in further detail below. While the present disclosure uses MSR-related terminology from the x86 platform, it is understood that other aspects of the present disclosure using other instruction set architectures have other equivalent control registers that may be adapted to the present technique as needed.

The CPU 104 is configured to provide processor-level support for virtual machines and virtualization technology, or virtual machine extensions (VMX). In an aspect, the CPU 104 supports one or more specialized hardware instructions for transferring control from a running guest application to the VMI 110 that handles the interface between the virtual machine(s) and the underlying hardware platform. In some aspects, the CPU 104 runs the VMM 110 in a specialized, privileged mode of operation (e.g., root mode of operation in x86 architectures), while the guest application is running in a "non-root" mode of operation. A transition from root operation to non-root operations and vice-versa are referred to as "VM entries" and "VM exits." Behavior of the CPU 104 in the non-root mode of operation is restricted and generally configured to facilitate virtualization. For example, instead of their ordinary operation, certain hardware instructions and events trigger a VM-EXIT event to transfer process control from the guest application to the VMM 110. While aspects are described in the context of an x86-based system, it is understood that aspects of the present disclosure are extendable to other architectures, such as ARM-based hardware processor architectures. In this case, a CPU 104 having an ARM-based architecture may be similarly configured to provide process-level support for virtual machines and virtualization technology by executing the VMM 110 in an exception layer 2 ("EL2") mode of operation or privileged level 2 ("PL2") mode of operation, while the guest applications are running in a lower mode of operation, such as an unprivileged mode of operation (e.g., EL0/PL0) suitable for executing user code or a privileged mode of operation (e.g., EL1/PL1) suitable for executing system code of an operating system.

In an aspect, the system 100 includes a debugger 128 configured to generate debug events used for examining the program code that is being executed (i.e., guest application 124). The debugger 128 may be configured to trace and alter the execution of a guest application 124 as a debuggee and monitor the application's internal values (independently of the application's normal behavior) based on virtualization-based events. During operation, the debugger 128 enables a computer programmer to observe execution of the debuggee by observing values of certain variables or user data of the debuggee, modify aspects of the execution state by altering individual quantities, or jump to different points within the guest application 124. In some aspects, the debugger 128 is implemented as a module or component of a software development tool or integrated development environment (IDE) having a graphical user interface for writing, editing, maintaining, and debugging source code, such as the source code of the debuggee 124. In other aspects, the debugger 128 is implemented as a standalone tool having a command line interface for executing machine code and/or monitoring the execution state of the debuggee.

In an aspect, the debugger 128 may be configured to receive a designation (e.g., via user input) of one or more control points for the guest application 124 which, when encountered during execution within the virtual machine, result in a pause or suspension in the execution of the debuggee. For example, the designation of a control point may be a user input selection indicating a particular location in or amongst the code instructions by a label or identifier (e.g., "#debug-point-1") or by a line number of source code. In another example, the designation of a control point may be a user input selection indicating a selected function name of the source code of the debuggee. In yet another example, the designation of a control point may be a user input selection indicating satisfaction of a particular condition, such as the program's internal variable having a certain value. In this way, such control points may be referred to as conditional control points.

In an aspect, the debugger 128 may store a mapping or association of the designated control point which is later used for filtering virtualization events that are correlated with a prior-designated control point from ordinary virtualization events. In one implementation, the debugger 128 may record a memory address of the program code corresponding to a designated control point, such as an offset address from the initial program counter of the debuggee. As described later, when execution of the debuggee is paused (as a guest application) due to a virtualization event, the debugger 128 may subsequently analyze the point of execution of the debuggee and determine whether the virtualization event is correlated with a pre-designated control point.

According to one aspect, the VMI 110 includes a virtualization event handler 112 configured to process any hardware-based events, exceptions, or interrupts generated by the hardware CPU 104. In some aspects, the virtualization event handler 112 is configured to handle such VM-EXITs by passing the VM-EXIT as a virtualization event to the debugger 128, which in turn analyzes the virtualization event. In some cases, a VM-EXIT is triggered in response to access of certain special registers, such as control registers (CR), debug registers (DR), and extended control registers (XCR). In other cases, a VM-EXIT is triggered in response to access of one or more MSRs 105, some of which can be configured to generate events, and some of which are unconditional in their ability to generate events. In some aspects, the virtualization event handler 112 and debugger 128 use such VM-EXITs to intercept events, which can change system behavior and can be used as breakpoints or for tracing (e.g., writing information into a log). It is understood that such events do not require any real breakpoints, but rather advantageously leverage the existing virtualization stack of the system 100.

In some aspects, the virtualization event handler 112 may be configured to enable or disable a single-stepping execution configuration of the CPU 104, such as a Monitor Trap Flag (MTF) setting in x86 architectures. When the MTF setting is enabled, the guest debuggee 124 triggers a VM-EXIT on certain instruction boundaries or forward progress of execution of program code (i.e., after executing each instruction of the debuggee). The virtualization event handler 112 and debugger 128 may use MTF events for execution tracing. This event is generated after the CPU executes one instruction of the guest application 124 (or injects one event) and have no exceptions. In some cases, the virtualization event handler 112 can enable MTF event generation when tracing is desired and disable MTF event generation afterwards. That is, the virtualization event handler 112 may enable MTF event generation for one command only for selective tracing. In some implementations, the virtualization event handler 112 may modify a MTF setting within a virtual-machine control data structure (VMCS) associated with the VM 120 on which the debuggee is executing. The VMCS is a data structure used by a logical processor (e.g., vCPU 131) to manage the transition in and out of non-root operation and to manage the behavior of the processor during non-root operation.

In another aspect, the virtualization event handler 112 may be configured to handle VM-EXITs that are triggered by nested page table (NPT) faults, also referred to Extended Page Tables (EPT) faults. Nested page tables are a set of paging structures used by the CPU 104 to translate guest physical addresses to host physical memory addresses that are used to access RAM 106. NPT faults cause the CPU 104 to perform a mapping between the guest virtual addresses, guest physical addresses, and host physical addresses using Second Level Address Translation (SLAT) in the system memory 106. NPT faults may be regarded as a type of VM-EXIT for discussion purposes of the present disclosure.

In implementations in which the system is executing on a hardware system having an ARM-based processor architecture, the virtualization event handler 112 may be configured to handle VM-EXITs that are triggered by a stage 2 translation fault. Hypervisors executing on certain hardware architectures (e.g., ARM processors) have to use a two-stage process to share the physical memory system between different guest operating systems. In a first stage controlled by the host OS, a virtual address is translated to an "intermediate physical address"; in the second stage controlled by the hypervisor, the intermediate physical address is translated to the final physical address. The stage 2 translations use an extra set of tables under control of the hypervisor; any access outside a defined address range causes a stage-2 translation fault.

The virtualization event handler 112 and the debugger 128 may be configured to use NPT-induced VM-EXITs for debugging the guest application as follows. Every page (i.e., 4096 bytes in all most architectures) of code or data can be configured in NPT by clearing access rights to generate a fault event upon access attempt, e.g., if one want to break on read, read permission should be cleared, etc. After such a control point is reached, the virtualization event handler 112 can set the page access rights back to normal to continue execution or changed in any other way. As such, the described aspects are able to provide breakpoint and/or watchpoint functionality without requiring any hardware breakpoints or dedicated breakpoint registers within the CPU 104, nor is limited to a count of such hardware registers. Additionally, the described aspects do not require the need to guess the size of an access element to specify in hardware watchpoints (in fact, aspects of the present disclosure permit the size of an access element to be as big as the whole debuggee itself or its data).

During stoppage of the debuggee, a user can modify registers and memory (i.e., values stored within guest memory) for debugging purposes, and such changes are applied before a next VM-ENTRY event occurs as described below. After the debugger has completed handling the debugging event, execution of the debuggee may be resumed. The virtualization event handler or debugger may trigger a VM-ENTRY event which causes the CPU 104 to transfer control from the VMM back to the VM currently running. The CPU 104 may restore values indicating the processor state and execution state of the debuggee from the virtual-machine control data structure, and resume execution. In some implementations, the debugger may receive a user input for resuming execution (e.g., user clicks a "resume" button) and in response triggers the VM-ENTRY event.

In some aspects, the debugger 124 can use any combination of the above-described event types, enabling and disabling them dynamically on-the-fly (i.e., during the execution of the debuggee). The debugger itself can be located inside the operating system (i.e., "internally"), handling virtualization events inside the same operating system, or outside the operating system (externally) and support remote debugging. In such aspects, the debugger may transmit debugging events via a network for analysis by an external debugging platform 114.

Aspects of the present disclosure for virtualization-assisted debugging advantageously provide additional points of code control, using conditional and unconditional virtualization events (so-called VM-EXIT's), conditional ones are even configurable, including MSR access, registers CR/DR/XCR access, CPU interrupts and exceptions, etc. Aspects of the present disclosure for virtualization-assisted debugging also employ nested page table (NPT) faults as an additional breakpoints and memory watchpoints and are advantageously not limited by number (i.e., one can control accesses to the whole guest memory) nor by access item size. Finally, aspects of the present disclosure for virtualization-assisted debugging also employ monitor trap flag (MTF) events for hardware tracing, which when compared to known trace flag techniques, advantageously allows that all instructions are traced through and no events are skipped. Since all of the described techniques are hardware-based techniques that employ hardware-assisted virtualization technologies, the hardware processor itself ensures that every event will be generated and processed correctly, thereby reducing the number of possible issues with the debugger itself.

In general, the term "module" as used herein can refer to a software service or application executed as part of the guest operating system 122 or the VMM 110. However, in general, the term module can be considered to be executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation described herein.

Moreover, in general, it should be appreciated that the disclosed system and method is described herein in the context of a hosted virtualized computing system. However, in alternative aspects, the system and method may be implemented for a non-hosted virtualized computer system, and may also be implemented directly in a computer's primary OS, both where the OS is designed to support virtual machines and where the OS does not support virtual machines. Additionally, in an aspect, the virtual machines described herein are system virtual machines (also referred to as full virtualization VMs) that provide control flow interception and are distinct from other types of virtual machines (e.g., process virtual machines) that are designed to execute computer programs in a platform-independent environment and only provide sandboxing of computing resources (such as Java virtual machines).

Figure 2:
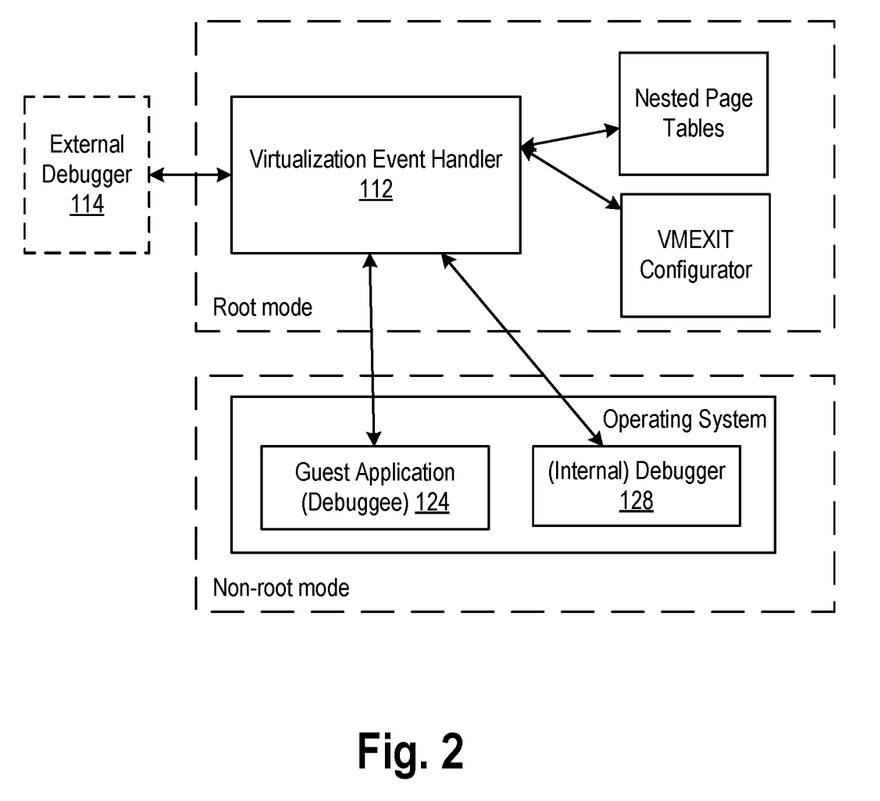
FIG. 2 is a block diagram illustrating a functional aspect of the system shown in FIG. 1 during example operations according to an exemplary aspect.

FIG. 2 is a block diagram illustrating a functional aspect of the system shown in FIG. 1 during example operations according to an exemplary aspect. FIG. 2 illustrates the described scheme for hooking and controlling virtualization events for debugging purposes.

During execution of the debuggee as a guest application of a VM, an unconditional VM-EXIT may be triggered, for example, when the processor executes CPUID instructions. The VM-EXIT causes a transition to be made between the VM 120 currently running the debuggee and the VMM 110, which exercises system control to manage the particular instruction or system call invoked by the guest. As part of the VM Exit event, the CPU 104 saves the VM's virtual processor state including information about virtual registers and model-specific registers into a guest state area, and loads the processor state of the VMM 110 based on the host state data (e.g., within a virtual-machine control data structure). This saved execution state can be subsequently examined by the debugger 128 for viewing the internal state of the debuggee and its internal values (e.g., parameter values, call stack, etc.). As such, by placing such an instruction in different places within the debuggee, the debugger 128 can get trace information when the debuggee is running. As mentioned above, this tracing technique does not use any hardware breakpoints, and the debuggee is expected to execute as normal.

In another example operation, the virtualization event handler 112 may be operated to use MTF for debuggee tracing. When the user wishes to trace (single step) a debuggee, the user may enable MTF in the hypervisor. After each processor instruction, even if the processor instruction causes an interrupt or exception, the instruction will be executed, and a MTF event is triggered. Again, the CPU 104 saves the VM's virtual processor state including information about the currently executing program code of the guest application (debuggee), and transfers control to the virtualization event handler (e.g., executing as part of the hypervisor). The virtualization event handler may extract information about the MTF event from the VMCS and pass such information to the debugger 128, which receives the MTF event. This behavior of the present disclosure has the following advantages over known approaches for tracing: one can trace all events, including interrupts and exceptions; one can trace even the debugging exceptions (which is impossible using known debugging techniques on known processor architectures), and there are no dependencies on a trace flag (meaning that even anti-debug code, i.e., program code that implement techniques for preventing reverse engineering or debugging, can traced as well).

In another example operation, the virtualization event handler 112 may be operated to use NPT faults for debugging purposes. To simulate a software breakpoint, the virtualization event handler can clear or change access rights to one or more entries in an NPT associated with the VM 120. The changed access rights may correspond to the condition desired for breaking. For example, if the programmer wishes the debuggee to break or pause on read, the virtualization event handler 112 may clear the read permission from the entries in the NPT (e.g., by changing the respective bits within a NPT entry that references a page-directory-pointer table). After such a control point is reached, and upon a VM-ENTRY back into the debuggee (i.e., when the debuggee resumes execution), the virtualization event handler 112 can set the page access rights back to normal to continue execute of the debuggee.

Figure 3:
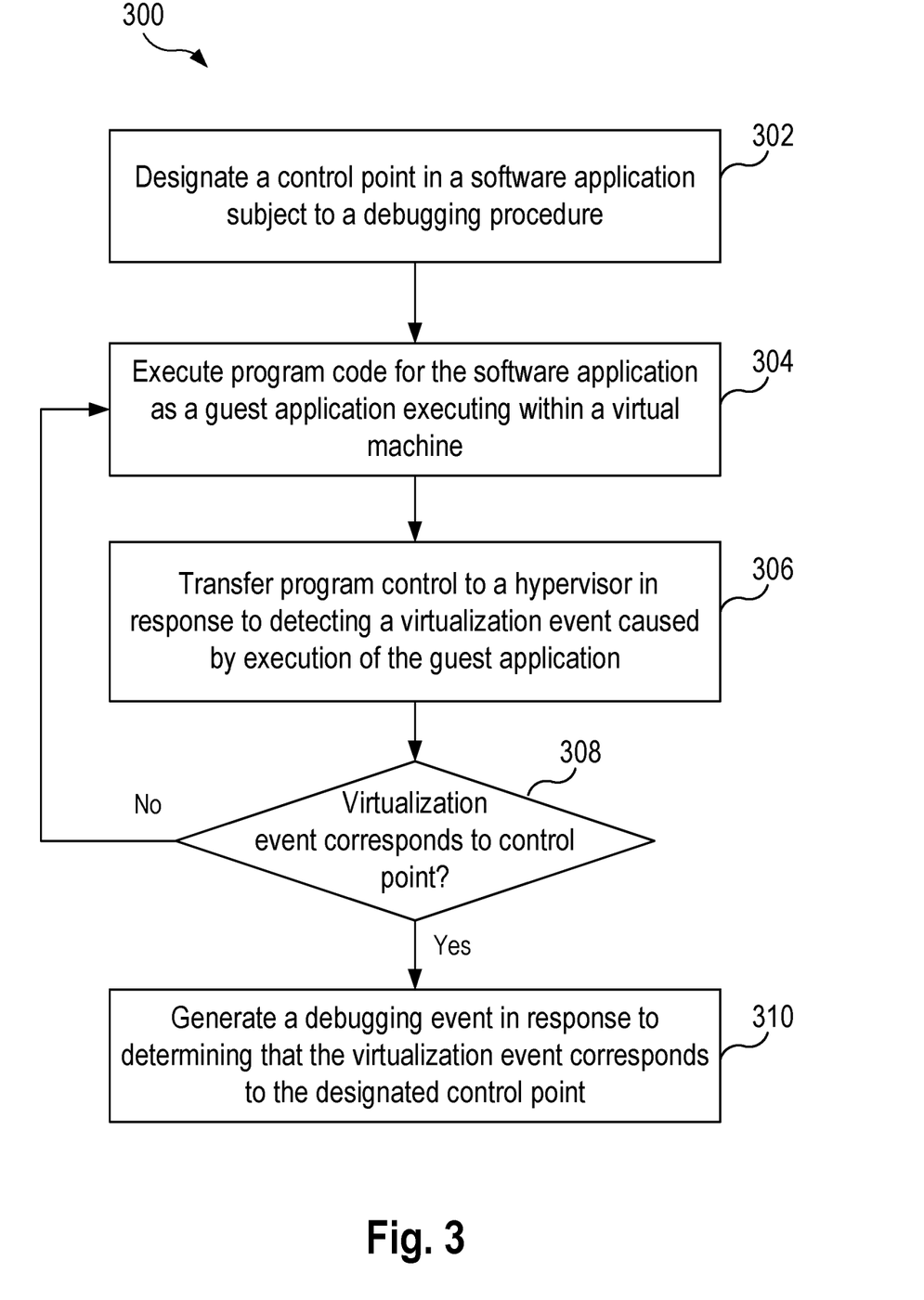
FIG. 3 is a flowchart illustrating a method for debugging program code using a computing system according to an exemplary aspect.

FIG. 3 is a flowchart illustrating a method 300 for debugging program code using a computing system according to an exemplary aspect. It is noted that the following description of the exemplary method makes reference to the system and components described above.

The method 300 begins at step 302, in which a control point in a software application subject to a debugging procedure is designed. At step 304, the CPU 104 executes program code for the software application as a guest application executing within a virtual machine.

At step 306, in response to detecting a virtualization event caused by execution of the guest application, the CPU 104 transfers program control to a hypervisor (e.g., VMM 110). In some aspects, the virtualization event is a VM-EXIT that marks the point at which a transition is made between the VM currently running (the debuggee code) and the VMM 110. As part of the VM-EXIT, the CPU 104 records information about the cause of the VM exit in the VM-EXIT information fields (e.g., exit reason, exit qualification, guest address), and updates VM-entry control fields. In some aspects, the CPU 104 may record the exit reason field with a code indicating a guest application running within the VM is subject to a virtualization-assisted debugging procedure. The CPU 104 may also save the processor state in the guest state area, including control registers, debug registers, segment registers, descriptor-table registers, RIP, RSP, and RFLAGs, as well as non-register states like pending debug exceptions. The CPU 104 may save the MSRs 105 within a VM-exit MSR-store area of the VMCS. The CPU 104 then loads the processor state based on a host-state area within the VMCS and VM-exit controls, including host control registers, debug registers, MSRs, host table and descriptor-table registers, page-directory pointer table entries, and loads MSRs from the VM-exit MSR-load area.

In some aspects, the virtualization event is not a hardware debug exception or a hardware breakpoint exception, but rather a dedicated event supported by the CPU 104 to facilitate virtualization and the execution of virtual machines on the physical computing device. In some aspects, the hypervisor is executing in a virtual machine extension (VMX) root mode of operation. In an alternative aspect, the hypervisor is executing in an exception layer 2 mode of operation on an ARM-based hardware architecture. The virtualization event may cause a change in mode of execution from a non-root mode of operation (e.g., for the guest application) to a root mode of operation (i.e., for the hypervisor). In some aspects, the CPU 104 may transfer program control to the hypervisor in response to detecting a nested page fault for the guest application executing within the virtual machine. In other aspects, the CPU may transfer program control to the hypervisor in response to detecting a monitor trap flag for the guest application executing within the virtual machine. As described above, it is understood that the described aspects enable the transfer of the program control without inserting debugging program instructions into the program code for the software application. When a user is debugging their own program or system, they can insert such commands or program instructions, that cause unconditional VM-exits and use them as breakpoints or watchpoints. If the user does not desire to modify program code, they can use existing commands or program instructions as watchpoints, This is especially useful in system-level debugging. The described technique can be used to obtain tracing information that indicates when and/or how often execution flow has passed a particular piece of code or a particular point within the code.

At step 308, the debugger determines whether the virtualization event corresponds to the designated control point based on an execution state of the guest application. In some aspects, the debugger determines that an address associated with the designated control point matches a virtual program counter from the execution state of the guest application. If so, at step 310, the debugger generates a debugging event in response to determining that the virtualization event corresponds to the designated control point. Otherwise, the debugger 128 may skip the VM-EXIT event and permit the virtualization event to be handled as during normal operation of the VMM 110.

Figure 4:
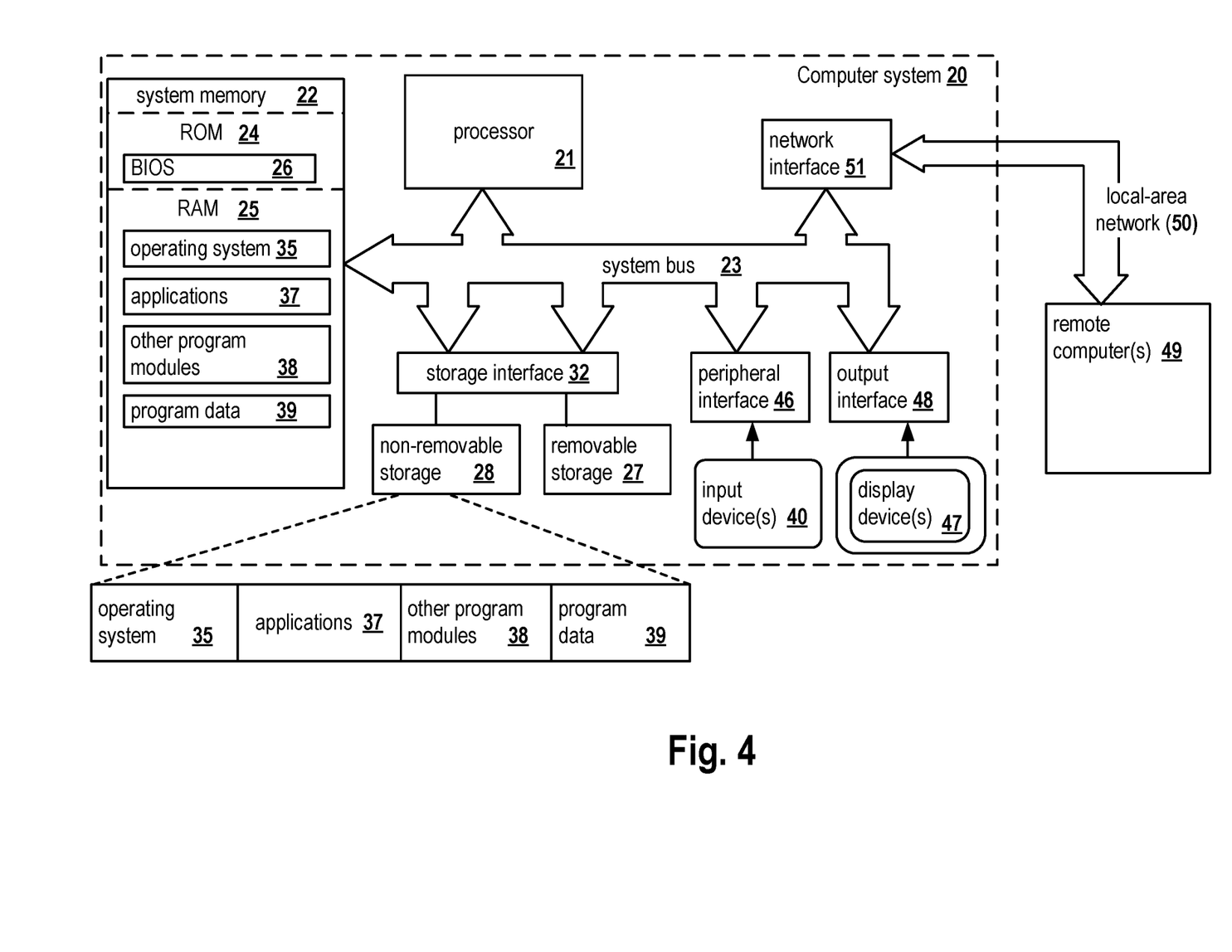
FIG. 4 is a block diagram of a computer system on which the disclosed system and method can be implemented according to an exemplary aspect.

FIG. 4 is a block diagram illustrating a computer system 20 on which aspects of systems and methods for debugging program code may be implemented in accordance with an exemplary aspect. It should be noted that the computer system 20 can correspond to the system 100, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computer system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for debugging program code using a computing system, comprising:
designating a control point in a software application subject to a debugging procedure;
executing, by a hardware processor, program code for the software application as a guest application executing within a virtual machine;
transferring, by the hardware processor, program control to a hypervisor in response to detecting a virtualization event caused by execution of the guest application;
determining whether the virtualization event corresponds to the designated control point based on an execution state of the guest application;
upon determining that the virtualization event corresponds to the designated control point generating a debugging event; and
upon determining that the virtualization event does not correspond to the designated control point handling the virtualization event with a virtual machine monitor of the virtual machine.

2. The method of claim 1, wherein
determining whether the virtualization event corresponds to the designated control point based on an execution state of the software application comprises:
determining that an address associated with the designated control point matches a virtual program counter from the execution state of the guest application.

3. The method of claim 1, further comprising:
transferring, by the hardware processor, program control to the hypervisor in response to detecting a monitor trap flag for the guest application executing within the virtual machine.

4. The method of claim 1, wherein
the hypervisor is executing in an exception layer 2 mode of operation.

5. The method of claim 1, wherein
designating the control point in a software application is performed without inserting debugging program instructions into the program code for the software application.

6. The method according to claim 1, wherein
the designated control point is a conditional control point.

7. The method according to claim 1, wherein the designated control point is a memory address of the program code; and determining whether the virtualization event corresponds to the designated control point comprises analysing whether a point of execution of the software application at which it is paused as a result of the virtualization event correlates with a memory address of the program code associated with the designated control point.

8. The method according to claim 1, wherein
the debugging event is transmitted via a network to an external debugging platform.

9. The method according to claim 1, further comprising
providing a specifically configured hypervisor for managing the virtual machine; wherein
the specifically configured hypervisor processes the virtualization events permitting normal virtualization events not associated with the designated control point to pass through and directing other virtualization events associated with the designated control point to a software debugger.

10. A system for debugging program code using a computing system, comprising:
a system memory configured to store program code for a software application; and
a hardware processor configured to:
designate a control point in the software application subject to a debugging procedure;
execute the program code for the software application as a guest application executing within a virtual machine;
transfer program control to a hypervisor in response to detecting a virtualization event caused by execution of the guest application;
determine whether the virtualization event corresponds to the designated control point based on an execution state of the guest application;
upon determining that the virtualization event corresponds to the designated control point generating a debugging event; and
upon determining that the virtualization event does not correspond to the designated control point handling the virtualization event with a virtual machine monitor of the virtual machine.

11. The system of claim 10, wherein
the hardware processor configured to determine whether the virtualization event corresponds to the designated control point based on an execution state of the software application is further configured to:
determine that an address associated with the designated control point matches a virtual program counter from the execution state of the guest application.

12. The system of claim 10, wherein
the hardware processor is further configured to:
transfer program control to the hypervisor in response to detecting a monitor trap flag for the guest application executing within the virtual machine.

13. The system of claim 10, wherein
the hypervisor is executing in an exception layer 2 mode of operation.

14. The system of claim 10, wherein
designating the control point in a software application is performed without inserting debugging program instructions into the program code for the software application.

15. The system according to claim 10, wherein
the designated control point is a conditional control point.

16. The system according to claim 10, wherein the designated control point is a memory address of the program code; and determining whether the virtualization event corresponds to the designated control point comprises analysing whether a point of execution of the software application at which it is paused as a result of the virtualization event correlates with a memory address of the program code associated with the designated control point.

17. The system according to claim 10, wherein
the debugging event is transmitted via a network to an external debugging platform.

18. The system according to claim 10, further comprising
providing a specifically configured hypervisor for managing the virtual machine; wherein
the specifically configured hypervisor processes the virtualization events permitting normal virtualization events not associated with the designated control point to pass through and directing other virtualization events associated with the designated control point to a software debugger.

19. A non-transitory computer readable medium comprising computer executable instructions for debugging program code using a computing system, including instructions for:
designating a control point in a software application subject to a debugging procedure;
executing program code for the software application as a guest application executing within a virtual machine;
transferring program control to a hypervisor in response to detecting a virtualization event caused by execution of the guest application;
determining whether the virtualization event corresponds to the designated control point based on an execution state of the guest application;
upon determining that the virtualization event corresponds to the designated control point generating a debugging event; and
upon determining that the virtualization event does not correspond to the designated control point handling the virtualization event with a virtual machine monitor of the virtual machine.

20. The computer readable medium of claim 19, wherein
the instructions for determining whether the virtualization event corresponds to the designated control point based on an execution state of the software application comprises instructions for:
determining that an address associated with the designated control point matches a virtual program counter from the execution state of the guest application.

21. The computer readable medium of claim 19, further comprising instructions for:
transferring program control to the hypervisor in response to detecting a monitor trap flag for the guest application executing within the virtual machine.

22. The computer readable medium of claim 19, wherein
the hypervisor is executing in an exception layer 2 mode of operation.

23. The computer readable medium of claim 19, wherein
designating the control point in a software application is performed without inserting debugging program instructions into the program code for the software application.

24. The computer readable medium according to claim 19, wherein
the designated control point is a conditional control point.

25. The computer readable medium according to claim 19, wherein the designated control point is a memory address of the program code; and determining whether the virtualization event corresponds to the designated control point comprises analysing whether a point of execution of the software application at which it is paused as a result of the virtualization event correlates with a memory address of the program code associated with the designated control point.

26. The computer readable medium according to claim 19, wherein
the debugging event is transmitted via a network to an external debugging platform.

27. The computer readable medium according to claim 19, wherein
 providing a specifically configured hypervisor for managing the virtual machine; wherein
 the specifically configured hypervisor processes the virtualization events permitting normal virtualization events not associated with the designated control point to pass through and directing other virtualization events associated with the designated control point to a software debugger.

* * * * *